United States Patent
Raja et al.

(10) Patent No.: US 11,573,919 B2
(45) Date of Patent: Feb. 7, 2023

(54) MULTI-SLAVE SERIAL COMMUNICATION

(71) Applicant: TEXAS INSTRUMENTS INCORPORATED, Dallas, TX (US)

(72) Inventors: Rakesh Raja, Allen, TX (US); Ishtiaque Amin, Farmers Branch, TX (US); Kuang Yu Chiang, Plano, TX (US); Ryan Kehr, Fairview, TX (US)

(73) Assignee: Texas Instruments Incorporated, Dallas, TX (US)

( * ) Notice: Subject to any disclaimer, the term of this patent is extended or adjusted under 35 U.S.C. 154(b) by 7 days.

(21) Appl. No.: 15/985,284

(22) Filed: May 21, 2018

(65) Prior Publication Data

US 2019/0188174 A1 Jun. 20, 2019

Related U.S. Application Data

(60) Provisional application No. 62/598,486, filed on Dec. 14, 2017.

(51) Int. Cl.
*G06F 13/40* (2006.01)
*G06F 13/42* (2006.01)
*G06F 1/08* (2006.01)

(52) U.S. Cl.
CPC .............. *G06F 13/405* (2013.01); *G06F 1/08* (2013.01); *G06F 13/423* (2013.01); *G06F 13/4291* (2013.01)

(58) Field of Classification Search
None
See application file for complete search history.

(56) References Cited

U.S. PATENT DOCUMENTS

| | | | | |
|---|---|---|---|---|
| 6,633,613 B1* | 10/2003 | Houlberg | ............... | H04N 19/90 375/E7.2 |
| 8,099,074 B2* | 1/2012 | Ebner | ............... | H04W 52/0216 600/316 |
| 8,127,059 B1* | 2/2012 | Carr | ...................... | G06F 13/387 710/74 |
| 10,366,034 B2* | 7/2019 | Zhong | ................. | G06F 13/4068 |
| 10,394,743 B2* | 8/2019 | Dube | ....................... | G06F 13/20 |
| 10,572,428 B2* | 2/2020 | Vonnahme | .............. | H04L 12/10 |
| 10,901,932 B2* | 1/2021 | Purcell | ................ | G06F 13/4022 |
| 2002/0133646 A1* | 9/2002 | Cheung | ................. | G06F 13/385 710/22 |

(Continued)

*Primary Examiner* — Henry Tsai
*Assistant Examiner* — Christopher A Bartels
(74) *Attorney, Agent, or Firm* — Valerie M. Davis; Frank D. Cimino

(57) ABSTRACT

A method for synchronous serial communication includes encoding, by a master device, a header field to be initially transmitted in a frame with a header identification code and a slave count value that defines a number of slave devices communicatively coupled to the master device. A plurality of address fields to be transmitted in the frame are also encoded by the master device. Each of the address fields corresponding to a different one the slave devices. A first of the address fields to be transmitted in the frame corresponds to a last of the slave devices to receive the header field, and a last of the address fields to be transmitted in the frame corresponds to a first of the slave devices to receive the header field. The frame is transmitted to the slave devices by the master device.

20 Claims, 4 Drawing Sheets

(56) References Cited

U.S. PATENT DOCUMENTS

| | | | |
|---|---|---|---|
| 2004/0148460 A1* | 7/2004 | Steinmetz | G06F 3/0607 711/114 |
| 2006/0174048 A1* | 8/2006 | Ohara | G06F 13/28 710/305 |
| 2007/0088537 A1* | 4/2007 | Lertora | G06F 15/7867 703/28 |
| 2008/0133779 A1* | 6/2008 | Ho | G06F 13/4291 710/5 |
| 2008/0162811 A1* | 7/2008 | Steinmetz | G06F 13/4234 711/114 |
| 2008/0201507 A1* | 8/2008 | Krampl | G06F 13/4291 710/104 |
| 2009/0103362 A1* | 4/2009 | Pekny | G06F 3/0679 365/185.04 |
| 2009/0137318 A1* | 5/2009 | Russo | G06F 13/4291 463/40 |
| 2011/0153910 A1* | 6/2011 | MacKenna | G06F 13/4234 711/103 |
| 2012/0324147 A1* | 12/2012 | Lai | G06F 13/4291 711/103 |
| 2013/0325998 A1* | 12/2013 | Hormuth | G06F 15/17331 709/212 |
| 2017/0039162 A1* | 2/2017 | Mishra | G06F 13/4282 |
| 2017/0220499 A1* | 8/2017 | Gray | G06F 13/36 |
| 2022/0210607 A1* | 6/2022 | Bollard | H04B 1/71632 |

* cited by examiner

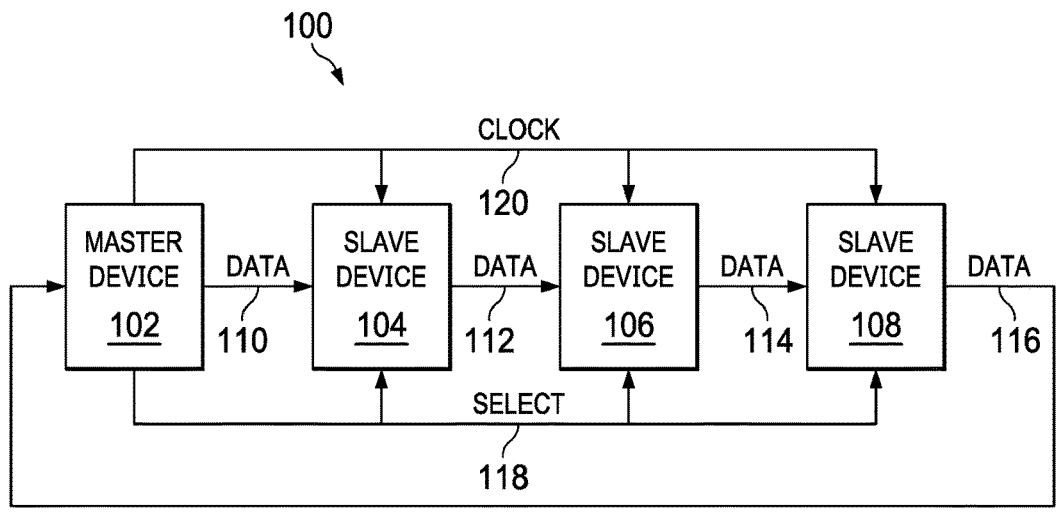
FIG. 1
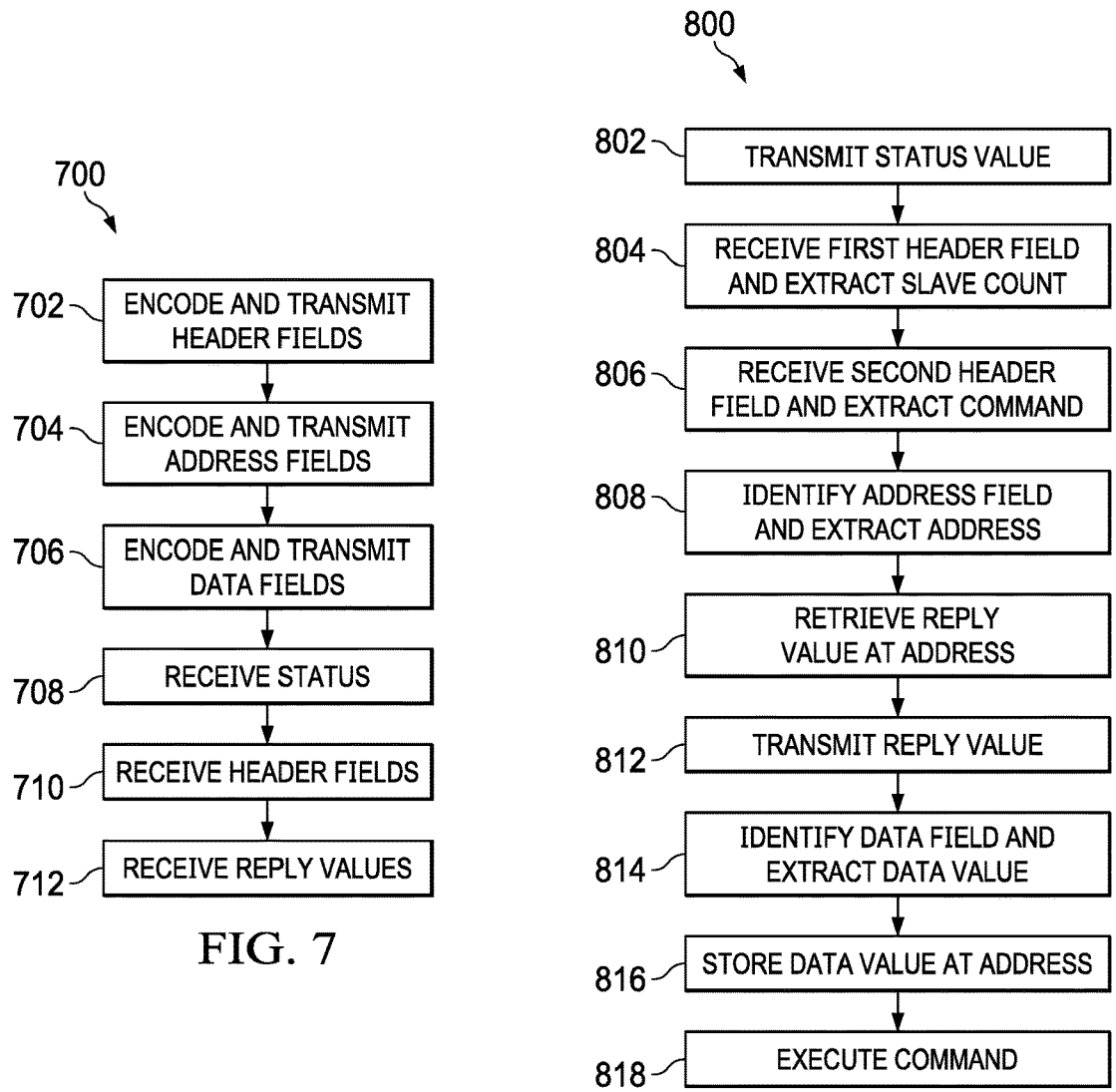
FIG. 7
FIG. 8

MULTI-SLAVE SERIAL COMMUNICATION

CROSS-REFERENCE TO RELATED APPLICATIONS

The present application claims priority to U.S. Provisional Patent Application No. 62/598,486, filed Dec. 14, 2017, titled "Robust, High-Speed Series Communication Technique of Multiple Serial Peripheral Interface Slave Devices Allowing Same-Frame Read Response," which is hereby incorporated herein by reference in its entirety.

BACKGROUND

Computers and other electronic systems use serial interfaces to provide for transfer of data between connected devices. Serial peripheral interface (SPI) is one type of serial communication interface that provides synchronous transfer of data between a master device, such as a microcontroller, and one or more peripherals (slave devices). In SPI, the master device generates a dock signal, a select signal and an input data signal (e.g., data transferred to the slave devices). The slave devices receive the input data signal synchronous with the clock signal while the select signal is active, and generate, synchronous with the dock signal, a data output signal for reception by the master device.

SUMMARY

An apparatus and method for synchronous serial communication between a master device and multiple slave devices is disclosed herein. In a first example, a synchronous serial communication system includes a master device. The master device is configured to communicate with a plurality of slave devices. The master device includes clock generation circuitry, frame control circuitry, and transmitter circuitry. The clock generation circuitry is configured to generate a clock signal for provision to the slave devices. The clock signal is to control synchronous transfer of serial data between the master device and the slave devices. The frame control circuitry is configured to generate a select signal, a header signal, and a plurality of address fields. The select signal defines a frame interval for provision to the slave devices. The header field is a first field to be transmitted in the frame interval, and specifies a number of slave devices communicatively coupled to the master device. The plurality of address fields are to be transmitted in the frame interval. Each of the address fields corresponds to a different one the slave devices. A first of the address fields to be transmitted in the frame interval corresponds to a last of the slave devices to receive the header field. The transmitter circuitry is coupled to the frame control circuitry. The transmitter circuitry is configured to transmit data provided by the frame control circuitry.

In another example, a synchronous serial communication system includes a slave device. The slave device is configured to communicate with a master device. The slave device includes receiver circuitry and execution control circuitry. The receiver circuitry is configured to identify a header field transmitted by the master device during a frame interval, and extract from the header field a slave count value specifying a number of slave devices communicatively coupled to the master device. The receiver circuitry is also configured to identify, based on the slave count value, an address field transmitted by the master device in the frame interval. The address field corresponds to the slave device. A first address field transmitted by the master device corresponds a last of the slave devices to receive the header field. The execution control circuitry is configured to apply an address value extracted from the address field to access a storage device of the slave device.

In a further example, a method for synchronous serial communication includes encoding, by a master device, a header field to be initially transmitted in a frame with a header identification code and a slave count value that defines a number of slave devices communicatively coupled to the master device. A plurality of address fields to be transmitted in the frame are also encoded by the master device. Each of the address fields corresponds to a different one the slave devices. A first of the address fields to be transmitted in the frame corresponds to a last of the slave devices to receive the header field, and a last of the address fields to be transmitted in the frame corresponds to a first of the slave devices to receive the header field. The header field and the address fields are transmitted to the slave devices by the master device.

BRIEF DESCRIPTION OF THE DRAWINGS

For a detailed description of various examples, reference will now be made to the accompanying drawings in which:

FIG. 1 shows a block diagram of an example of a synchronous serial communication system in accordance with the present disclosure;

FIG. 7 shows a flow diagram for an example of a method for operating a master device in a synchronous serial communication system in accordance with the present disclosure; and FIG. 8 shows a flow diagram for an example of a method for operating a slave device in a synchronous serial communication system in accordance with the present disclosure.

DETAILED DESCRIPTION

Figure 2:
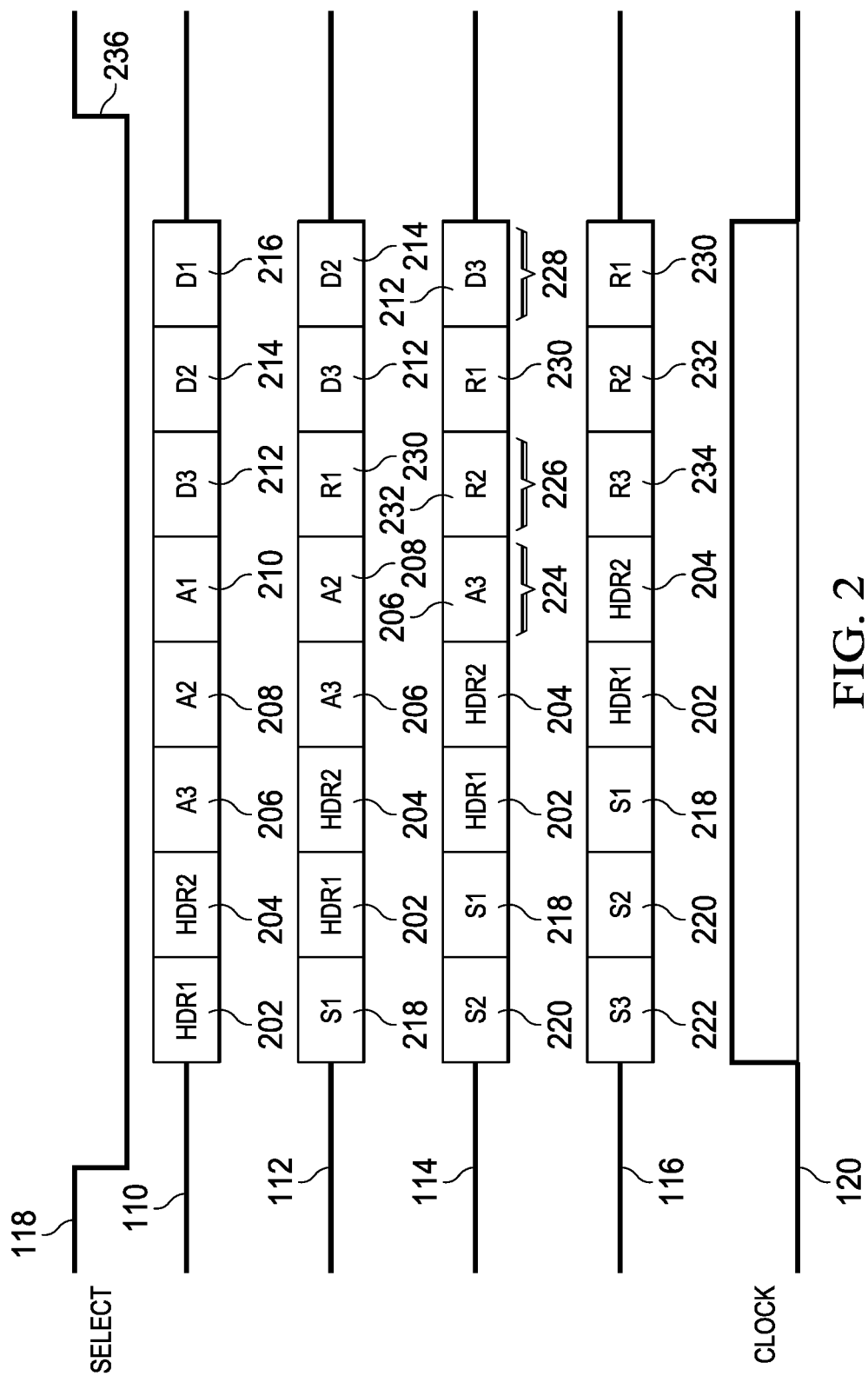
FIG. 2 shows an example of signals transmitted in a multi-slave synchronous serial communication system in accordance with the present disclosure.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

Serial peripheral interface (SPI) is a synchronous serial communication system that may be applied in a variety of applications. Each device implementing SPI includes a data input terminal, a data output terminal, a clock terminal, and one or more select terminals. An SPI master device drives a clock signal onto its clock terminal, drives output data onto its data output terminal synchronous with the clock, and samples data on its data input terminal synchronous with the clock. The SPI master activates a select signal on a select terminal to choose a slave for communication. An SPI slave device receiving the activated select signal on its select terminal receives a clock signal on its clock terminal, drives output data onto its data output terminal synchronous with the clock, and samples data on its data input terminal synchronous with the clock.

Devices communicating via SPI may be arranged in parallel or daisy-chained configurations. In the parallel configuration, the master device provides a separate select signal for each slave device while the data lines and clock signal are shared by all slave devices. The parallel configuration provides high data throughput, but requires that the master device include a select terminal for each slave device, thus requiring the master device to have a large number of terminals in some applications. In the daisy chain configuration, the select signal and clock signal generated by the master device are connected in parallel to all slave devices while the data lines are connected from slave device to slave device in series to form a loop that begins and ends at the master device. The daisy chain configuration allows for a reduced number of terminals on the master device, but limits communication bandwidth. For example, in some implementations, two transactions (two communication frames) are required to read from a slave device. In systems that allow single frame reads, transfer speed of information through the serially connected slave devices is reduced as the number of slave devices increases.

The synchronous serial communication system disclosed herein employs the daisy-chain configuration to reduce the number of terminals required on the master device, allows reads in a single frame, and provides a transfer bit rate that is independent of the number of slave devices in the chain. Some implementations provide operation with a single slave device without introducing additional protocol overhead.

FIG. 1 shows a block diagram of an example of a synchronous serial communication system 100 in accordance with the present disclosure. The synchronous serial communication system 100 includes a master device 102 and one or more slave devices that communicate with the master device 102. In the example of FIG. 1, the synchronous serial communication system 100 include slave device 104, slave device 106, and slave device 108. Other implementations of the synchronous serial communication system 100 include a different number of slave devices. In the synchronous serial communication system 100, the master device 102, and the slave devices 104-108 are coupled in a daisy-chain configuration, such that data originating in the master device 102 is passed to the slave device 108 through the slave device 104 and the slave device 106. For example, the master device 102 outputs data signal 110. The slave device 104 receives the data signal data signal 110 and outputs the data signal 112, which includes a portion of the data provided via the data signal data signal 110. The slave device 106 receives the data signal data signal 112 and outputs the data signal 114, which includes a portion of the data provided via the data signal 112. The slave device 108 receives the data signal 114 and outputs the data signal 116, which includes a portion of the data provided via the data signal data signal 114. The master device 102 receives the data signal 116.

The master device 102 controls the transfer of information in the synchronous serial communication system 100 by generation of a select signal 118, a clock signal 120, and the data signal 110. The select signal 118 defines a frame interval (a time during which data is transferred between the master device 102 and the slave devices 104-108.) The clock signal 120 defines the time at which each bit of the data signal 110, data signal 112, data signal 114, and data signal 116 is output by a transmitter and/or sampled by a receiver. The master device 102 encodes the various fields of the data signal 110 as needed to control and optimize the transfer of information from the master device 102 to the slaves 104-108, and from the slaves 104-108 to the master device 102. For example, the master device 102 encodes a header field in each frame. The header field includes a slave count value that informs the slave devices 104-108 of the number of slave devices connected to the master device 102. The slave devices 104-108 identify the header field and extract the slave count value. On receipt of the header field, each of the slave devices 104-108 determines its position in the synchronous serial communication system 100 (i.e., its location in the series of slave devices), and knows the total number of slave devices. With this information, each of the slave devices 104-108 identify the particular fields (e.g., address and data fields) provided in the data signal 110 that correspond to the slave device. Having identified a field particular to the slave device, the slave device extracts a value from the field, and transmits a reply value in place of the field. Thus, the original value of a field need not be passed to downstream slave devices to which the field is irrelevant. In this way, the synchronous serial communication system 100 reduces the overhead associated with read transactions in the synchronous serial communication system 100.

FIG. 2 shows an example of signals transmitted in the synchronous serial communication system 100. In FIG. 2, the master device 102 initiates a frame by activating the select signal 118 (e.g., driving the select signal 118 low). On the data signal 110, the master device 102 drives a first header field 202, a second header field 204, a first address field 206, a second address field 208, a third address field 210, a first data field 212, a second data field 214, and a third data field 216. Some implementations do not include the header field 204. The first header field 202 is the first field transmitted in the frame. Implementations of the synchronous serial communication system 100 that include a different number of slave devices will include a different number of address fields and data fields (e.g., the data signal 110 will include one address field and one data field for each slave device connected to the master device 102). In the data signal 110, the address field 206 specifies an address of the slave device 108 to be accessed, the address field 208 specifies an address of the slave device 106 to be accessed, and the address field 210 specifies an address of the slave device 104 to be accessed. More generally, the first address field driven onto the data signal 110 by the master device 102 specifies an address of the last slave device in the series of slave devices (i.e., the last slave device in the series of slave devices to receive the header field 202), and the last address field driven onto the data signal 110 by the master device 102 specifies an address of the first slave device in the series of slave devices (i.e., the first slave device in the series of slave devices to receive the header field 202). Similarly, the data field 212 specifies a data value to be written into the slave device 108 at the corresponding address, the data field 214 specifies a data value to be written into the slave device 106, and the data field 216 specifies a data value to written into the slave device 104. More generally, the first data field driven onto the data signal 110 by the master device 102 specifies a data value to be written into the last slave device in the series of slave devices (i.e., the last slave device, in the series of slave devices, to receive the header field 202), and the last data field driven onto the data signal 110 by the master device 102 specifies a data value to be written into the first slave device in the series of slave devices (i.e., the first slave device, in the series of slave devices, to receive the header field 202).

Figure 3:
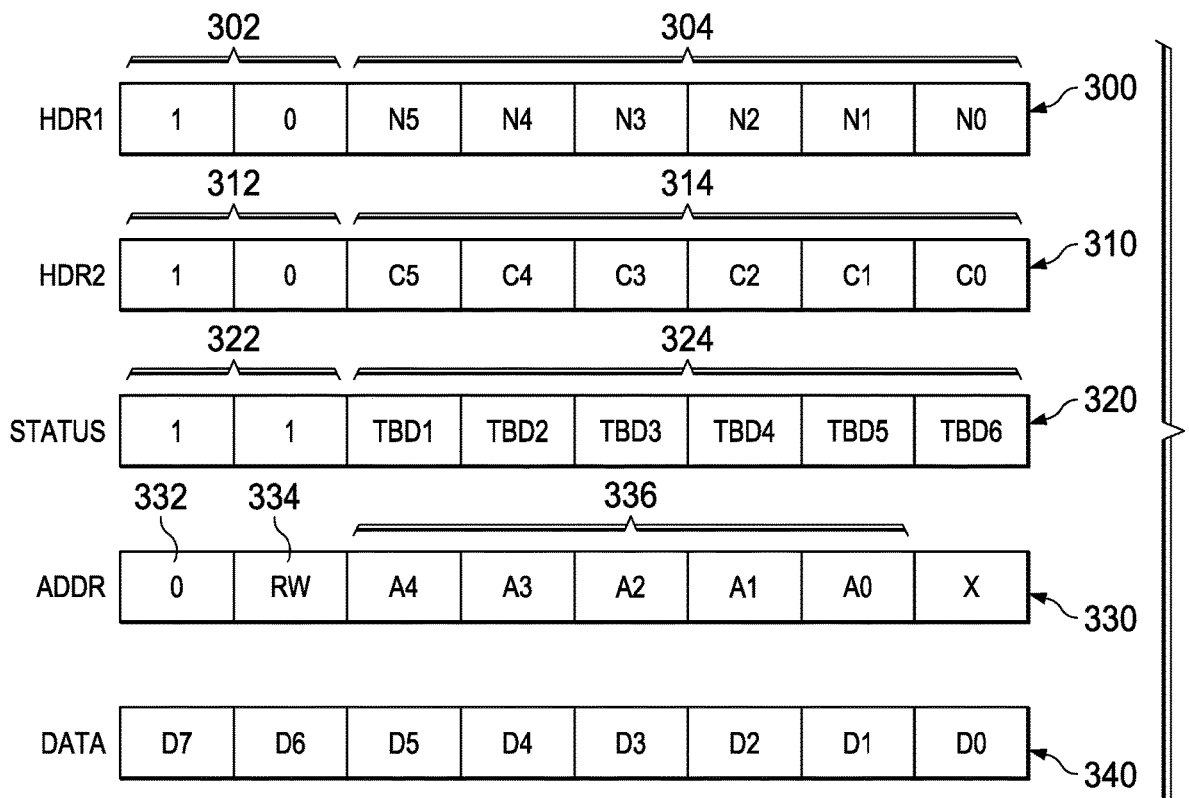
FIG. 3 shows an example of field encodings applied in a synchronous serial communication system in accordance with the present disclosure.

FIG. 3 shows an example of field encodings applied in the synchronous serial communication system 100. While the fields shown in FIG. 3 are eight bits in length, in some implementations, the fields include a different number of bits. The header field 300 is an implementation of the header field 202. The header field 300 includes a header identification value 302 that identifies the header field 300 as a header field, and includes a slave count value 304 that specifies the number of slave devices connected to the master device 102. For example, in the implementation of the synchronous serial communication system 100 shown in FIG. 1, the slave count value 304 would be encoded with a value of three. The header identification value 302 is disposed at the start of the header field and is therefore the first value transmitted by the master device 102 that is received by each of the slave devices 104-108.

The header field 310 is an implementation of the header field 204. The header field 310 includes a header identification value 312 that identifies the header field 310 as a header field. The header identification value 312 is the same as the header identification value 302 in some implementations. The header field 310 also includes a command value 314. The command value 314 specifies an operation to be performed by all of the slave devices (i.e., the command value 314 specifies a broadcast command). All of the slave devices simultaneously execute an operation defined by the command value 314. For example, all of the slave devices execute the operation defined by the command value 314 at the termination of the frame in which the header field 310 is received.

The address field 330 is an implementation of the address field 206, the address field 208, and/or the address field 210. The address field 330 includes an identification value 332 that identifies the address field 330 as an address field. The address field 330 also includes a read/write control value 334 and an address value 336. The identification value 332 specifies whether a location of the slave device corresponding to the address value 336 is to be read or written. For example, if the read/write control value 334 is a logic "one", then the address corresponding address value 336 is to be read, and if the read/write control value 334 is a logic "zero", then the address corresponding to the address value 336 is to be written.

The data field 340 is an implementation of the data field 212, the data field 214, and/or the data field 216. The data field 340 specifies a value to be written at the address value 336 of the slave device. For example, a slave device writes the value contained in the data field 340 to the address specified in the address field 330 corresponding to the slave device at the termination of the frame in which the data field 340 is received.

Returning now to FIG. 2, when the select signal 118 is active, and the slave devices 104-108 begin to receive the clock signal 120, each of the slave devices 104-108 transmits a status value. For example, while the slave device 104 is receiving the header field 202, the slave device 104 is transmitting a status field 218 in the data signal 112, the slave device 106 is transmitting a status field 220 in the data signal 114, and the slave device 108 is transmitting a status field 222 in the data signal 116. FIG. 3 shows the encoding of a status field 320. The status field 320 is an implementation of the status field 218, the status field 220, and/or the status field 222. The status field 320 includes an identification value 322, and a status value 324. The identification value 322 identifies the status field 320 as a status field, and the status value 324 provides state information with respect to the corresponding slave device.

As each of the slave devices 104-108 receives a field from the upstream device (e.g., the field is shifted into the device), the slave device identifies the field and determines whether the field is to be retransmitted. For example, the header fields 202 and 204 transmitted by the master device 102 are retransmitted by each of the slave devices 104-108, and returned to the master device 102. The master device 102 receives the header fields and confirms based on the receipt of the header fields that synchronous serial communication system 100 is transferring data properly.

As each of the slave devices 104-108 receives the first header field 202, the slave device identifies the field as a header field based on the header identification value 302, and extracts, from the header field 202, the slave count value 304. Similarly, if a second header field 204 follows the first header field 202, the receiving slave device identifies the field as a header field based on the header identification value 312, and extracts from the header field 204 the command value 314. While receiving the header field 204, the slave device retransmits the header field 202.

Following transmission of the one or more header fields, the master device 102 transmits an address field for each of the slave devices. The address field 206, corresponding to the slave device that last receives the header field 202, is transmitted immediately after the header fields, and the address field 210, corresponding to the slave device the first receives the header field 202 is the last transmitted address field. The slave devices 104-108 use the slave count value 304 to identify the address field corresponding to the slave device (e.g., to determine when to capture the address field corresponding to the slave device). For example, the slave devices 104-108 count the number of fields received in the frame. The address field corresponding to the slave device is captured in the field at the sum of the slave count value 304 and the number of header fields identified. In FIG. 2, each of the slave devices 104-108 captures a corresponding address value in the interval 224. The captured address value identifies a storage location, such as a register, a memory location, or other address identifiable device, containing information to be returned to the master device 102. Having captured the address value in interval 224, the slave retrieves the information stored at the address, and transmits the retrieved information in interval 226.

Following transmission of the address fields, the master device 102 transmits a data field for each of the slave devices. The data field 212, corresponding to the slave device that last receives the header field 202, is transmitted immediately after the address fields, and the data field 216, corresponding to the slave device that first receives the header field 202 is the last transmitted data field. The slave devices 104-108 use the slave count value 304 to identify the data field corresponding to the slave device (e.g., to determine when to capture the data field corresponding to the slave device). For example, the slave devices 104-108 count the number of fields received in the frame. The data field corresponding to the slave device is captured in the field at the sum of twice the slave count value and the number of header fields identified. In FIG. 2, each of the slave devices 104-108 captures a corresponding data value in the interval 228. At termination of the frame, e.g., at 236, each of the slave devices stores the data value extracted from the data field corresponding to the slave device to a storage location specified by the address value captured in the interval 224.

Figure 4:
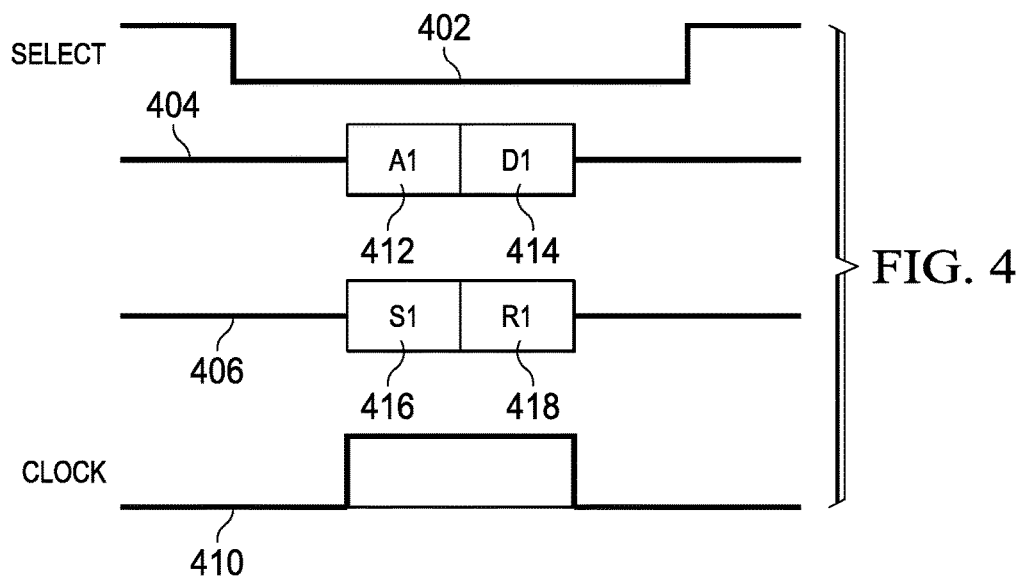
FIG. 4 shows an example of signals transmitted in a single slave synchronous serial communication system in accordance with the present disclosure.
Figure 5:
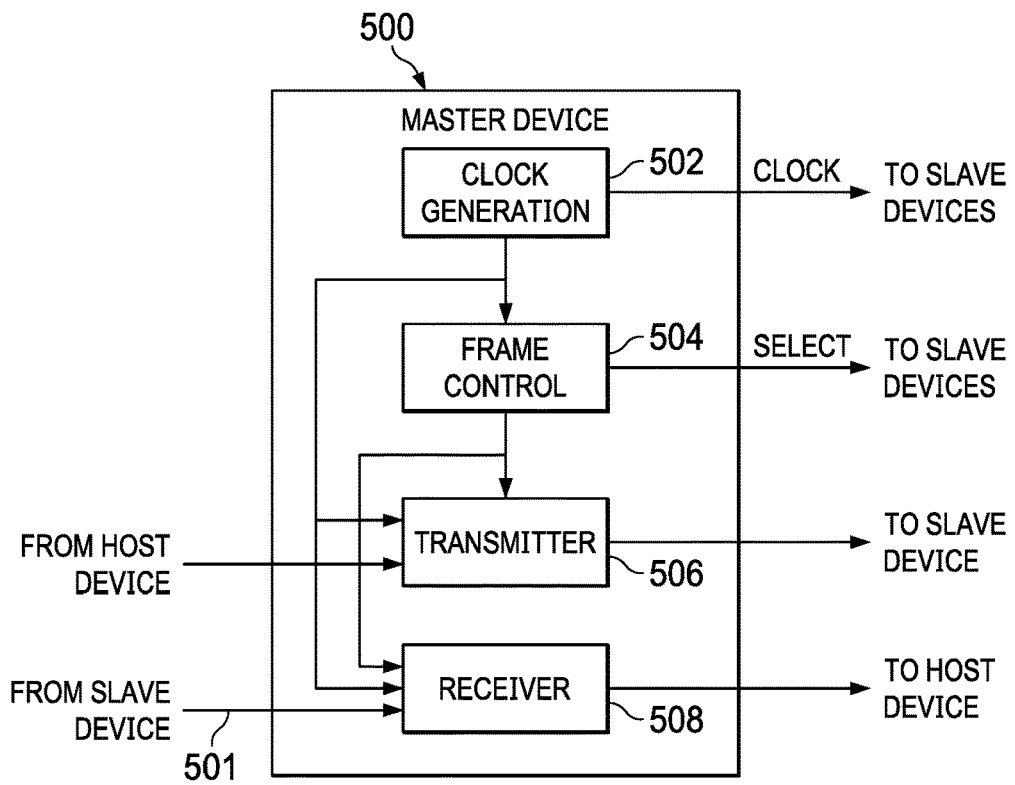
FIG. 5 shows a block diagram of an example of a master device suitable for use in a synchronous serial communication system in accordance with the present disclosure.

Implementations of the master device 102 and the slave device 104 (all the slave devices are identical in some implementations) also provide for communication between a master device and a single slave device without additional protocol overhead. FIG. 5 shows an example of signals transmitted in a single slave synchronous serial communication system in accordance with the present disclosure. In FIG. 4, the master device 102 outputs a select signal 402, a data signal 404, and a clock signal 410. The slave device 104 receives the select signal 402, the data signal 404, and the clock signal 410, and outputs the data signal 406. The select signal 402 defines a frame interval (a time during which data is transferred between the master device 102 and the 104. The clock signal 410 defines the time at which each bit of the data signal 404 and the data signal 406 is transmitted and received.)

The master device 102 initiates a frame by activating the select signal 402 (e.g., driving the select signal 402 low). On the data signal 404, the master device 102 drives an address field 412 and a data field 414. In the data signal 404, the address field 412 specifies an address of the slave device 104 to be accessed, and the data signal 406 specifies a data value to be written into the slave device 104 at the corresponding address. While the slave device 104 is receiving the address field 412, the slave device 104 transmits a status field 416 on the data signal 406. On receipt of the address value contained in the address field 412, the slave device 104 retrieves the information located at the address value, and transmits the information as a reply value 418 while receiving the data field 414. After receiving that data field 414 and extracting a data value therefrom, the slave device 104 writes the data value to a storage location specified by the address value at termination of the frame (e.g., a deactivation of the select signal 402).

FIG. 5 shows a block diagram of an example of a master device 500 suitable for use in a synchronous serial communication system in accordance with the present disclosure. The master device 500 is an implementation of the master device 102. The master device 500 includes clock generation circuitry 502, frame control circuitry 504, transmitter circuitry 506, and receiver circuitry 508. The clock generation circuitry 502 generates the clock signal 120. The clock generation circuitry 502 includes counters or other programmable frequency dividers to produce a desired clock frequency from a source clock signal.

The frame control circuitry 504 includes circuitry to control generation of the various fields transmitted in the data signal 110. For example, the frame control circuitry 504 includes circuitry to encode a header field 300 with a header identification value 302 and a slave count value 304, to encode a header field 310 with a header identification value 312 and a command value 314, to encode an address field 330 with an identification value 332, a read/write control value 334, and an address value 336, and to retrieve a data value (from storage, registers, etc.) for transmission in a data field (212-216). The frame control circuitry 504 also includes circuitry, such as a state machine, that controls the order of transmission of the various fields transmitted in the data signal 110, and controls the generation of various signals provided to the slave devices (e.g., select signal 118, clock signal 120).

The transmitter circuitry 506 includes parallel-to-serial conversion circuitry (such as a parallel load shift register) to convert multi-bit values to be transmitted serial data for inclusion in the serial data signal 110. Some multi-bit values received by the transmitter circuitry 506 are provided by a system hosting the master device 500 or by the frame control circuitry 504. For example, in one implementation, the master device 500 is included in a system to monitor and/or control operation of one or more electric motors.

The receiver circuitry 508 includes serial-to-parallel conversion circuitry (such as a parallel output shift register) to convert the serial data signal 116 received from the slave devices 104-108 to multi-bit values. Multi-bit values produced by the receiver circuitry 508 are provided to a system hosting the master device 500. The receiver circuitry 508 also includes circuitry to identify the header field 202 looped back from the slave devices 104-108 in some implementations.

Figure 6:
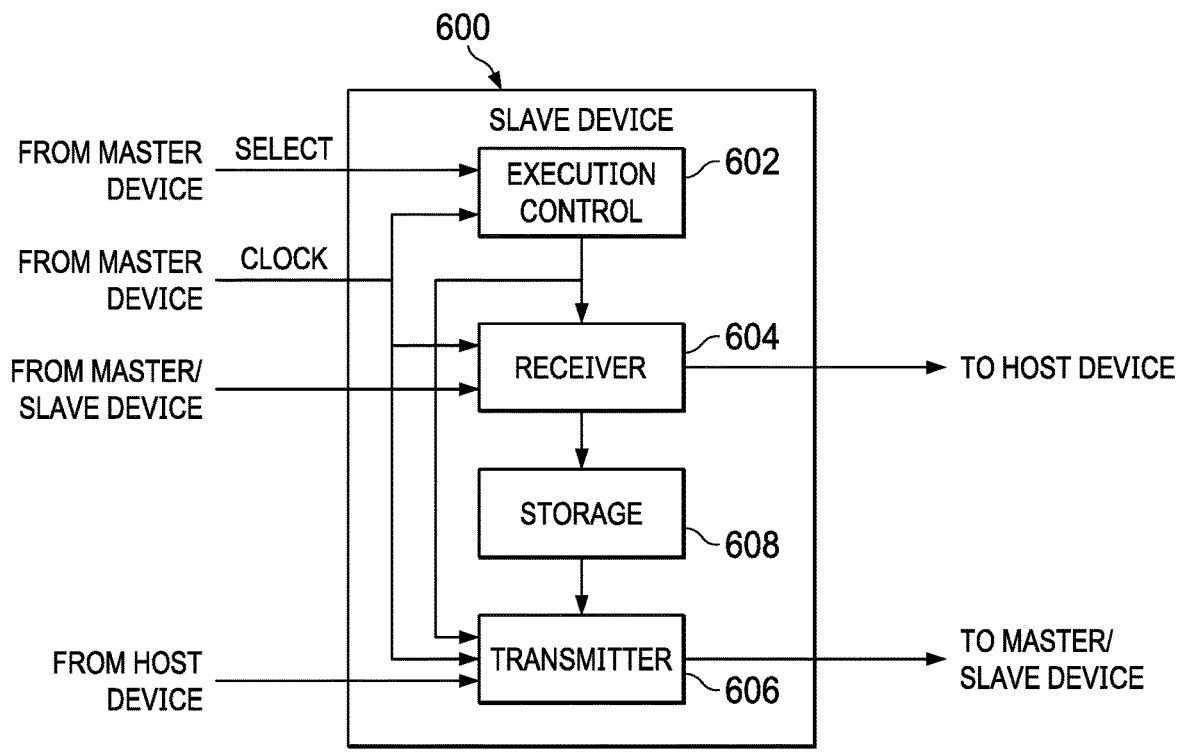
FIG. 6 shows a block diagram of an example of a slave device suitable for use in a synchronous serial communication system in accordance with the present disclosure.

FIG. 6 shows a block diagram of an example of a slave device 600 suitable for use in a synchronous serial communication system in accordance with the present disclosure. The slave device 600 is an implementation of the slave device 104, the slave device 106, and/or the slave device 108. The slave device 600 includes execution control circuitry 602, receiver circuitry 604, transmitter circuitry 606, and storage 608. The execution control circuitry 602 includes circuitry to execute a command received in a header field 310, to execute reads from a storage device as specified in an address field 330, and/or to execute writes to a storage device as specified in an address field 330.

The storage 608 includes memory and/or registers that are readable and/or writable by the execution control circuitry 602. Data retrieved from the storage 608 is transferred to the transmitter circuitry 606 for transmission in the data signal 116, and data received via the data signal 110 is transferred to the storage 608 for storage.

The receiver circuitry 604 includes serial-to-parallel conversion circuitry (such as a parallel output shift register) to convert a received serial data stream, such as the data signal 110, to multi-bit values. Multi-bit values produced by the receiver circuitry 604 are provided to a system hosting the slave device 600 (e.g., an electric motor control/monitoring system) or written to the storage 608 or another storage device. The receiver circuitry 604 also includes circuitry to identify the various fields received in a frame and extract information from the fields. For example, the receiver circuitry 604 includes circuitry to identify the header field 300, the header field 310, the address field 300, and the data field 340.

The transmitter circuitry 606 includes parallel-to-serial conversion circuitry (such as a parallel load shift register) to convert multi-bit values to be transmitted to the serial data signal 116. Some multi-bit values produced by the transmitter circuitry 606 are provided by a system hosting the slave device 600, or retrieved from the storage 608 or another storage device.

FIG. 7 shows a flow diagram for an example of a method 700 for operating a master device in a synchronous serial communication system in accordance with the present disclosure. Though depicted sequentially as a matter of convenience, at least some of the actions shown can be performed in a different order and/or performed in parallel. Additionally, some implementations perform only some of the actions shown. Operations of the method 700 are performed by implementations of the master device 102.

In block 702, the master device 102 is initiating a transaction with multiple slave devices. The 702 actives the select signal 118, and encodes a header field 300 for transmission. Encoding the header field 300 includes encoding a header identification value 302 in the header field 300, and encoding a slave count value 304 in the header field 300. The master device 102 provides the header field 300 to the transmitter circuitry 506 for serialization and transmission.

Some implementations of the master device 102 also encode a header field 310 for transmission. Encoding the header field 310 includes encoding an identification value 312 in the header field 310, and encoding a command value 314 in the header field 310. The master device 102 provides the header field 310 to the transmitter circuitry 506 for serialization and transmission.

In block 704, the master device 102 encodes and transmits an address field 330 for each slave device coupled to the master device 102. Encoding an address field 330 includes encoding an identification value 332 in the address field 330, encoding a read/write control value 334 in the address field 330, and encoding an address value 336 in the address field 330. Each encoded address field 330 is provided to the transmitter circuitry 506 for serialization and transmission. Chronologically, the address fields are provided to the transmitter circuitry 506 in reverse order of reception of the header field 300. That is, a first address field 330 provided to the transmitter circuitry 506 is directed to the last slave device to receive the header field 300 transmitted at the start of the frame, and the last address field 330 provided to the transmitter circuitry 506 is directed to the first slave device to receive the header field 300 transmitted at the start of the frame.

In block 706, the master device 102 encodes and transmits a data field 340 for each slave device coupled to the master device 102. Encoding a data field 340 includes encoding a data value in the data field 340. Each data field 340 is provided to the transmitter circuitry 506 for serialization and transmission. Chronologically, the data fields are provided to the transmitter circuitry 506 in reverse order of reception of the header field 300. That is, a first data field 340 provided to the transmitter circuitry 506 is directed to the last slave device to receive the header field 300 transmitted at the start of the frame, and the last data field 340 provided to the transmitter circuitry 506 is directed to the first slave device to receive the header field 300 transmitted at the start of the frame.

In block 708, the master device 102 receives the status fields (e.g., status field 218, status field 220, status field 222) transmitted by the slave devices while the master device 102 transmitted the header field 300. The receiver circuitry 508 converts each of the status fields to a multi-bit parallel status value, and the received status value is provided to a host device or stored in a storage device. A status value is received for each slave device coupled to the master device 102. Chronologically, the first status value received by the receiver circuitry 508 was transmitted by the last slave device to receive the header field 300 transmitted at the start of the frame, and the last status value received by the receiver circuitry 508 was transmitted by the first slave device to receive the header field 300 transmitted at the start of the frame.

In block 710, the master device 102 receives the header field 300, and the header field 310 in some implementations, that the slave devices retransmitted. The receiver circuitry 508 converts each of the header fields to a multi-bit parallel header value, and the master device 102 compares the received header value to the transmitted header value to verify proper operation of the synchronous serial communication system 100.

In block 712, the master device 102 receives the reply fields (e.g., reply field 230, reply field 232, reply field 234) transmitted by the slave devices. The receiver circuitry 508 converts each of the reply fields to a multi-bit parallel reply value, and the received reply value is provided to a host device or stored in a storage device. A reply value is received for each slave device coupled to the master device 102. Chronologically, the first reply value received by the receiver circuitry 508 was transmitted by the last slave device to receive the header field 300 transmitted at the start of the frame, and the last reply value received by the receiver circuitry 508 was transmitted by the first slave device to receive the header field 300 transmitted at the start of the frame. After the master device 102 receives the last reply value, the frame is complete, and the master device 102 deactivates the select signal 118.

FIG. 8 shows a flow diagram for an example of a method 800 for operating a slave device in a synchronous serial communication system in accordance with the present disclosure. Though depicted sequentially as a matter of convenience, at least some of the actions shown can be performed in a different order and/or performed in parallel. Additionally, some implementations perform only some of the actions shown. Operations of the method 800 are performed by implementations of the slave device 104, the slave device 106, and/or the slave device 108.

In block 802, the slave device 104 detects activation of the select signal 118 and encodes a status field 320 for transmission. Encoding the status field 320 includes encoding a 322 identification value and a status value 324 in the status field 320. The slave device 104 provides the status field 320 to the transmitter circuitry 606 for serialization. When the master device 102 activates the clock signal 120, the slave device 104 transmits a bit of the status field with each clock cycle until transmission of the status value is complete.

In block 804, while the slave device 104 is transmitting the status field 320, the slave device 104 receives the header field 300. The receiver circuitry 604 converts the header field 300 to a multi-bit parallel header value, and identifies the field as a header value based on the header identification value 302. The receiver circuitry 604 extracts the slave count value 304 from the header field 300 for use in identifying the address field and the data field in the data signal 110 that correspond to the slave device 104. The receiver circuitry 604 also counts the number of fields (e.g., the number of bytes) received in the frame for use in identifying the address field and the data field in the data signal 110 that correspond to the slave device 104.

In block 806, the slave device 104 receives the header field 310. The receiver circuitry 604 converts the header field 310 to a multi-bit parallel header value, and identifies the field as a header value based on the header identification value 312. The receiver circuitry 604 determines that the header field 310 is the second header field received, and extracts the command value 314 from the header field 300 for execution (e.g., execution at the end of the frame).

In block 808, the slave device 104 applies the slave count value 304 extracted from the header field 300 and the count of received fields to identify the address field 330 corresponding to the 104. For example, the address field 330 corresponding to the slave device 104 is the Nth field received in the frame where N is the sum of the slave count value 304 and the number of header fields received in the frame. The slave device 104 extracts the read/write control value 334 and the address value 336 from the address field 330.

In block 810, the slave device 104 (e.g., the execution control circuitry 602) applies the address value 336 to retrieve a reply value to be transmitted to the master device 102. The slave device 104 retrieves the reply value from the storage 608 or from a host device that includes the address field and the data field in the data signal 110 that correspond to the slave device 104.

In block 812, the slave device 104 transmits the reply value to the master device 102. The slave device 104 provides the reply value to the transmitter circuitry 606, and the transmitter circuitry 606 serializes the reply value for transmission. The slave device 104 transmits the reply value while the master device 102 is transmitting the first data field 212. The slave device 104 identifies the first data field 212 based on the slave count value 304.

In block 814, the slave device 104 (e.g., the receiver circuitry 604) applies the slave count value 304 extracted from the header field 300 and the count of received fields to identify the data field 340 corresponding to the 104. For example, the data field 340 corresponding to the slave device 104 is the Nth field received in the frame where N is the sum of the number of header fields received in the frame and twice the slave count value 304. The slave device 104 captures the data value provided in the data field 340.

In block 816, the slave device 104 (e.g., the execution control circuitry 602) stores the data value captured in block 814 at the address value 336 extracted from the address field 330 in block 808.

In block 818, the slave device 104 executes the command value 314 extracted from the header field 310 in block 806.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A synchronous serial communication system, comprising:
    a master device and a specified number of multiple slave devices communicatively coupled to the master device in series configuration, the master device including:
        clock generation circuitry configured to provide a clock signal to the multiple slave devices, wherein the clock signal controls synchronous transfer of serial data between the master device and the multiple slave devices;
        frame control circuitry configured to:
            provide to the multiple slave devices a select signal that defines a frame interval;
            provide a header field as a first field to be transmitted in the frame interval, wherein data in the header field includes the specified number and position of each of the multiple slave devices in the series configuration; and
            provide a plurality of address fields to be transmitted in the frame interval, each of the address fields corresponding to a different one the multiple slave devices, wherein a first of the address fields to be transmitted in the frame interval corresponds to a last of the multiple slave devices to receive the header field; and
        transmitter circuitry coupled to the frame control circuitry, the transmitter circuitry configured to transmit data provided by the frame control circuitry.

2. The synchronous serial communication system of claim 1, wherein the frame control circuitry is configured to insert a header identification value into the header field, the header identification value including a portion of the header field to be first received by the multiple slave devices.

3. The synchronous serial communication system of claim 2, wherein the header field is a first header field, and the frame control circuitry is configured to generate a second header field as a second value to be transmitted in the frame interval, wherein the second header field specifies a command to be executed by the multiple slave devices, and the second header field includes the header identification value.

4. The synchronous serial communication system of claim 1, wherein a last of the address fields to be transmitted in the frame interval corresponds to a first of the multiple slave devices to receive the header field.

5. The synchronous serial communication system of claim 1, wherein the master device includes receiver circuitry configured to:
    receive data transmitted by the multiple slave devices; and
    identify the header field in the data transmitted by the multiple slave devices.

6. The synchronous serial communication system of claim 1, wherein each of the multiple slave devices is configured to transmit a status value concurrent with the master device transmitting the header field.

7. The synchronous serial communication system of claim 1, wherein each of the multiple slave devices is configured to:
    extract the specified number from the header field; and
    capture the address value of the corresponding slave device based on the number of multiple slave devices extracted from the header field.

8. The synchronous serial communication system of claim 1, wherein the frame control circuitry is configured to:
    provide data fields to be transmitted in the frame interval, each of the data fields corresponding to a different one of the multiple slave devices;
    wherein:
        a first of the data fields to be transmitted in the frame interval corresponds to a last of the multiple slave devices to receive the header field; and
        the first of the data fields to be transmitted is appended to a last of the address fields to be transmitted.

9. The synchronous serial communication system of claim 8, wherein each of the multiple slave devices is configured to:
    extract the specified number from the header field; and
    identify the first of the data fields based on the number of multiple slave devices extracted from the header field; and
    transmit a reply value concurrent with the master device transmitting the first of the data fields.

10. The synchronous serial communication system of claim 8, wherein a last of the data fields to be transmitted in the frame interval corresponds to a first of the multiple slave devices to receive the header field; and wherein each of the multiple slave devices is configured to:
    extract the specified number from the header field;
    capture a data value from a one of the data fields for the corresponding slave device based on the specified number extracted from the header field; and
    transfer the data value to a storage device at termination of the frame interval.

11. A synchronous serial communication system, comprising:
a specified number of multiple slave devices serially coupled to, for communication with, a master device using a clock signal transmitted by the master device, one of the multiple slave devices including:
receiver circuitry configured to:
identify a header field transmitted by the master device during a frame interval, wherein the header field includes the specified number;
extract from the header field a slave count value representing the specified number;
identify, based on the slave count value, an address field transmitted by the master device in the frame interval, wherein the address field corresponds to the one slave device, and wherein a first address field transmitted by the master device in the frame interval corresponds to a last of the multiple slave devices to receive the header field; and
execution control circuitry configured to apply an address value extracted from the address field to access a storage device of the one slave device.

12. The synchronous serial communication system of claim 11, wherein the first slave device includes transmitter circuitry configured to transmit a status value while the master device is transmitting the header field.

13. The synchronous serial communication system of claim 11, wherein:
the header field is a first header field; and
the receiver circuitry is configured to:
identify a second header field transmitted by the master device during the frame interval;
extract from the second header field a command to be executed by the one slave device; and
the execution control circuitry is configured to execute the command simultaneously with execution of the command by all of the multiple slave devices.

14. The synchronous serial communication system of claim 11, wherein:
the receiver circuitry is configured to identify, based on the slave count value, a data field transmitted by the master device in the frame interval, wherein the data field corresponds to the one slave device, and wherein a first data field transmitted by the master device corresponds a last of the multiple slave devices to receive the header field; and
the execution control circuitry is configured to apply the address value to write a data value extracted from the data field to the storage device of the one slave device.

15. The synchronous serial communication system of claim 11, wherein the one slave device includes transmitter circuitry configured to transmit a reply value concurrent with the master device transmitting the first data field; wherein the reply value corresponds to information stored at the address value.

16. The synchronous serial communication system of claim 11, wherein the master device includes:
clock generation circuitry configured to generate the clock signal for provision to the multiple slave devices, wherein the clock signal is to control synchronous transfer of data between the master device and the multiple slave devices;
frame control circuitry configured to:
generate a select signal that defines the frame interval for provision to the multiple slave devices;
generate the header field as a first field to be transmitted in the frame interval;
generate a plurality of address fields to be transmitted in the frame interval, each of the address fields corresponding to a different one the multiple slave devices, wherein the first address field to be transmitted in the frame interval corresponds to a last of the multiple slave devices to receive the header field, and last address field to be transmitted in the frame interval corresponds to a first of the multiple slave devices to receive the header field; and
generate a plurality of data fields to be transmitted in the frame interval, each of the data fields corresponding to a different one the multiple slave devices, wherein a first of the data fields to be transmitted in the frame interval corresponds to a last of the multiple slave devices to receive the header field, and the first of the data fields to be transmitted is appended to a last of the address fields to be transmitted; and
transmitter circuitry coupled to the frame control circuitry, the transmitter circuitry configured to transmit data produced by the frame control circuitry; and
receiver circuitry configured to identify the header field in data received from the multiple slave devices.

17. A method for synchronous serial communication, comprising:
encoding, by a master device, a header field to be initially transmitted in a frame, the header field including a header identification code that identifies the header field and a slave count value that defines a number of multiple slave devices communicatively coupled to the master device in a series configuration;
encoding, by the master device, address fields to be transmitted in the frame, each of the address fields corresponding to a different one of the multiple slave devices, wherein a first of the address fields to be transmitted in the frame corresponds to a last of the multiple slave devices to receive the header field, and a last of the address fields to be transmitted in the frame corresponds to a first of the multiple slave devices to receive the header field; and
transmitting, by the master device, the header field and the address fields to the multiple slave devices.

18. The method of claim 17, wherein the header field is a first header field, and the method further includes encoding, by the master device, a second header field to be transmitted in the frame immediately after the first header field with a header identification code that identifies the header field and a command value that defines a command to be simultaneously executed by the multiple slave devices.

19. The method of claim 17, including encoding, by the master device, data fields to be transmitted in the frame, each of the data fields corresponding to a different one of the multiple slave devices, wherein a first of the data fields to be transmitted in the frame corresponds to a last of the multiple slave devices to receive the header field, and a last of the data fields to be transmitted in the frame corresponds to a first of the multiple slave devices to receive the header field, and the first of the data fields to be transmitted is appended to a last of the address fields to be transmitted.

20. The method of claim 19, including:
transmitting, by each slave device, a status value concurrent with the master device transmitting the header field;
extracting, by each slave device, the slave count value from the header field;
capturing, by each slave device, the corresponding address value for that slave device based on the slave count value extracted from the header field;

identifying, by each slave device, the first of the data fields based on the slave count value extracted from the header field;

transmitting, by each slave device, a reply value while the master device is transmitting the first of the data fields;

capturing, by each slave device, a data value from a one of the data fields for the corresponding the slave device based on the slave count value extracted from the header field; and storing, by each slave device, the data value in a storage device at termination of the frame.

* * * * *